June 30, 1931.    G. MELLING    1,812,601
MILLING AND DRILLING MACHINE
Filed Nov. 19, 1928    6 Sheets-Sheet 1

INVENTOR
George Melling
BY Chappell Earl
ATTORNEYS

June 30, 1931.         G. MELLING         1,812,601
MILLING AND DRILLING MACHINE
Filed Nov. 19, 1928       6 Sheets-Sheet 4

INVENTOR
George Melling
BY Chappell & Earl
ATTORNEYS

June 30, 1931.  G. MELLING  1,812,601
MILLING AND DRILLING MACHINE
Filed Nov. 19, 1928   6 Sheets-Sheet 5

INVENTOR
George Melling
BY Chappell & Earl
ATTORNEYS

June 30, 1931. G. MELLING 1,812,601
MILLING AND DRILLING MACHINE
Filed Nov. 19, 1928 6 Sheets-Sheet 6

Patented June 30, 1931

1,812,601

UNITED STATES PATENT OFFICE

GEORGE MELLING, OF JACKSON, MICHIGAN

MILLING AND DRILLING MACHINE

Application filed November 19, 1928. Serial No. 320,241.

The main objects of this invention are:

First, to provide a combined milling and drilling machine which is adapted to perform several operations with one set-up of the work, the machine being entirely automatic except in the matter of chucking the work and throwing into gear.

Second, to provide a machine of the class described which is very compact and at the same time is of large capacity.

Third, to provide a machine of this type in which the work is effectively positioned or fed to the different stations.

Objects pertaining to details and economies of my invention will definitely appear from the description to follow. The invention is defined in the claims.

A machine embodying the features of my invention is clearly illustrated in the accompanying drawings, in which:

Fig. 2 is a vertical section through the operative or working portion of the machine on a line corresponding to line 2—2 of Figs. 6 and 7.

Referring to the drawings, the pedestal 1 is of suitable size to support the operative parts of the mechanism which is mainly enclosed in a housing 2. This housing is, in the embodiment illustrated, formed as an integral casting with the exception of the rear side plate 3, a supporting frame or spider 4 being arranged between this side plate and the main body of the housing, see Figs. 4, 5, 6 and 7.

The main driving shaft 5 is provided with a pulley 6 at the rear and has bearings 8 in the front wall 7 of the housing and the bearing 9 in the spider 4.

The work holder or carriage designated generally by the numeral 10 is mounted on the outer end of a rockshaft 11. This rockshaft is supported in the bearing 12 in the spider or supporting plate 4 and in a bearing 13 on the front wall 7 of the housing.

The machine illustrated is designed for the machine of coupling members or yokes 14 such as are employed on the ends of connecting rods in various relations in automobiles and the like. The machine is designed to mill the inner and outer sides of the arms of the coupling, drill the hole, remove the burr which may result from the drilling, and then ream the hole.

The milling cutters 15 are arranged in a set of three, the same being carried by the cutter shaft 16 arranged parallel with and above the rockshaft 11. This shaft 16 is supported by a bearing 17 in the front wall 8 of the housing and a bearing 18 in the spider 4. Means are provided for adjusting the cutters which will be described later.

The reamer spindle 19 is supported in the bearing 20 in the front wall of the housing and in the bearing 21 in the spider 4, the reamer being shown at 22. The drill spindle 23 is disposed parallel to the work carriage shaft and the driving shaft and is supported in the bearing 24 in the front wall of the housing and the bearing 25 in the spider 4. The drill is shown at 26. The relation of these shafts is best shown in Figs. 2, 4, 5 and 6.

The driving shaft 5 is provided with a pinion 27 meshing with a pinion 28 on the drill spindle, the gear 28 being long enough to permit the axial movement of the spindle. The cutter shaft 16 is provided with a gear 29 meshing with a pinion 30 on the driving shaft 5.

The reamer spindle 19 is connected to the driving shaft 5 through a train of gears consisting of the pinion 31 on the shaft 19, the pinion 32 on the shaft 33 and a pinion 34 on the shaft 33 meshing with the gear 29. The gear 31 is of sufficient length to permit the axial movement of the reamer.

Figure 6:
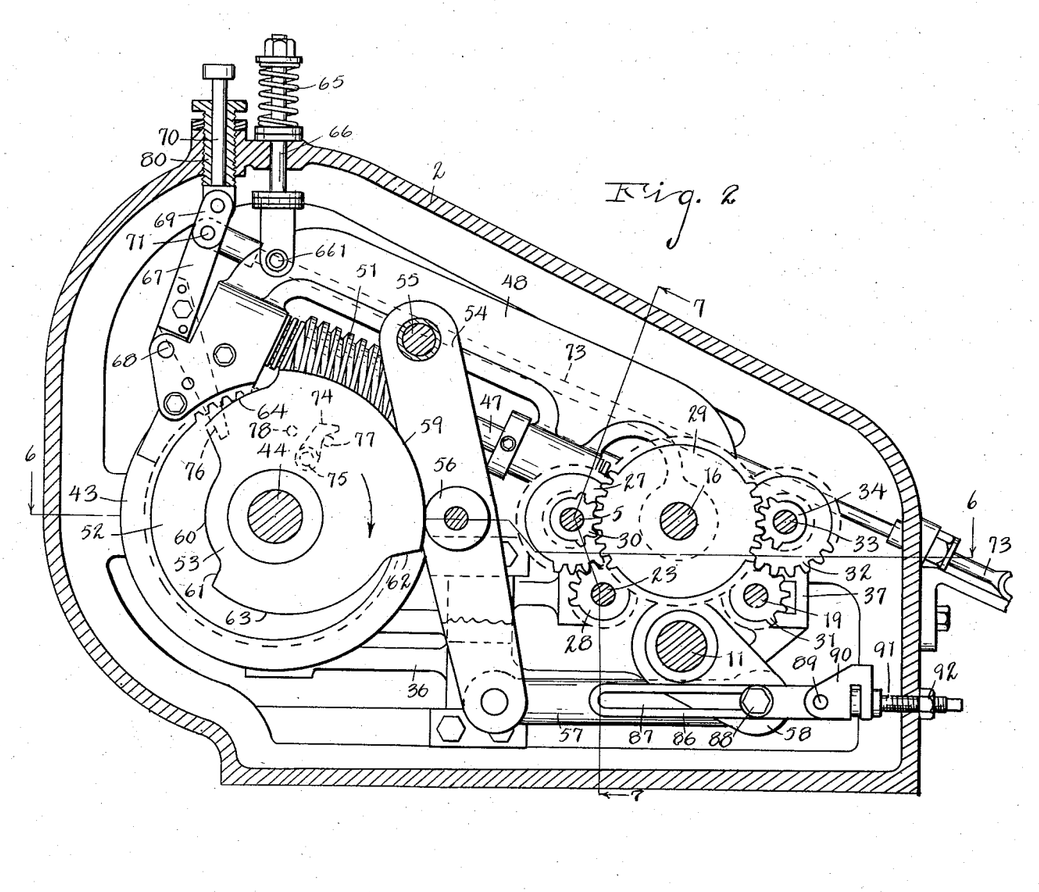
Fig. 6 is a detail view partially in horizontal section on a line corresponding to line 6—6 of Figs. 1, 2 and 7.
Figure 7:
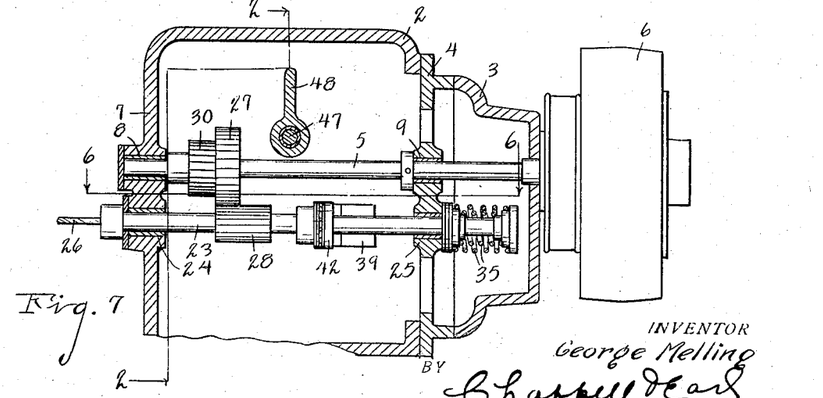
Fig. 7 is a fragmentary view partially in vertical section on line 7—7 of Figs. 1 and 2.

The drill and reamer spindles are held normally retracted or yieldingly returned to their retracted position by means of the coiled springs 35, see Figs. 6 and 7. The reamer spindle is actuated by means of the lever 36 which is forked at 37 to engage the thrust collar 38. The drill spindle 23 is similarly actuated through the lever 39, both levers being mounted on the same pivot 41 on the spider 4. The lever 39 is forked to engage the thrust bearing 42.

A cam member 43 is mounted on the cam shaft 44 and provided with cams 45 and 46, the cam 45 coacting with the reamer lever while the cam 46 coacts with the drill spindle actuating lever. The cams are suitably positioned and the cam shaft 44 is driven with an intermittent drive to properly time the advancing and retracting of the drill and reamer. This driving is also synchronized with the actuation of the work carriage.

Figures 3, 12:
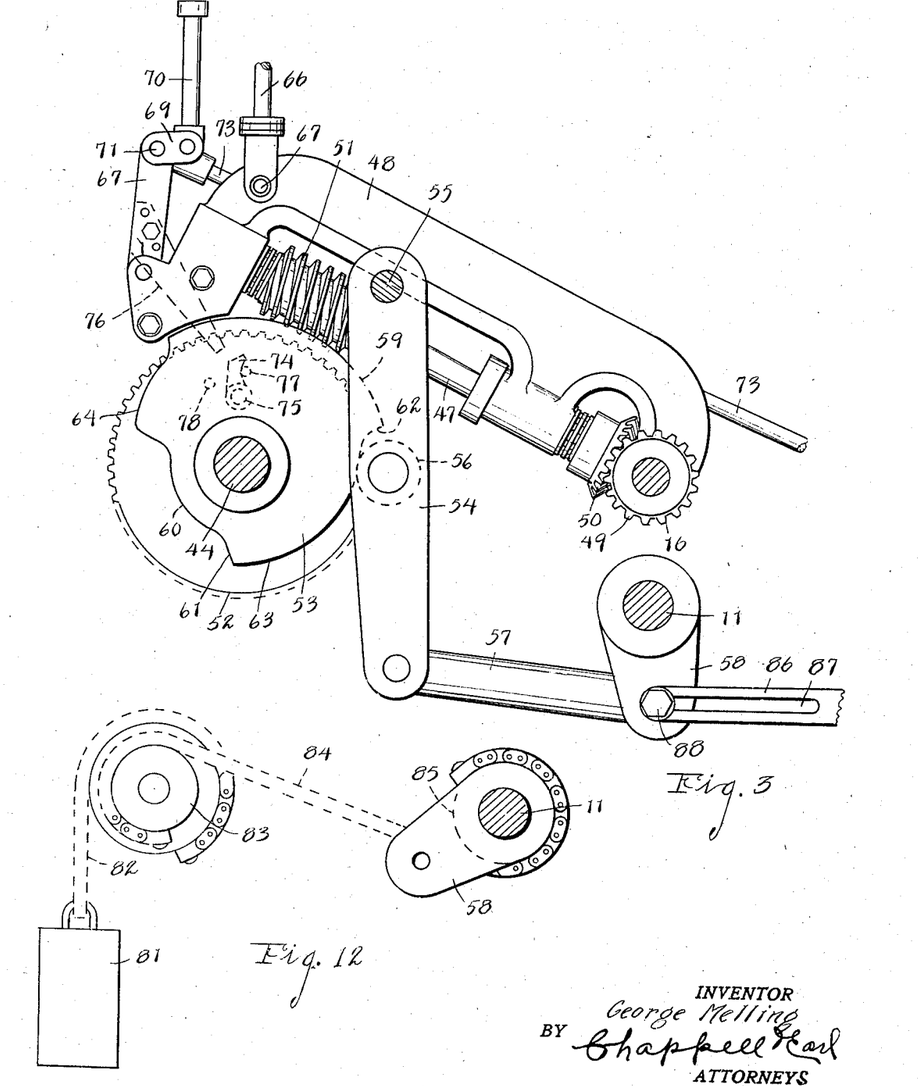
Fig. 3 is a fragmentary view showing parts of Fig. 2 in another position.
Fig. 12 is a detail view of the tensioning means for the work holder or carriage operating mechanism.
Figure 4:
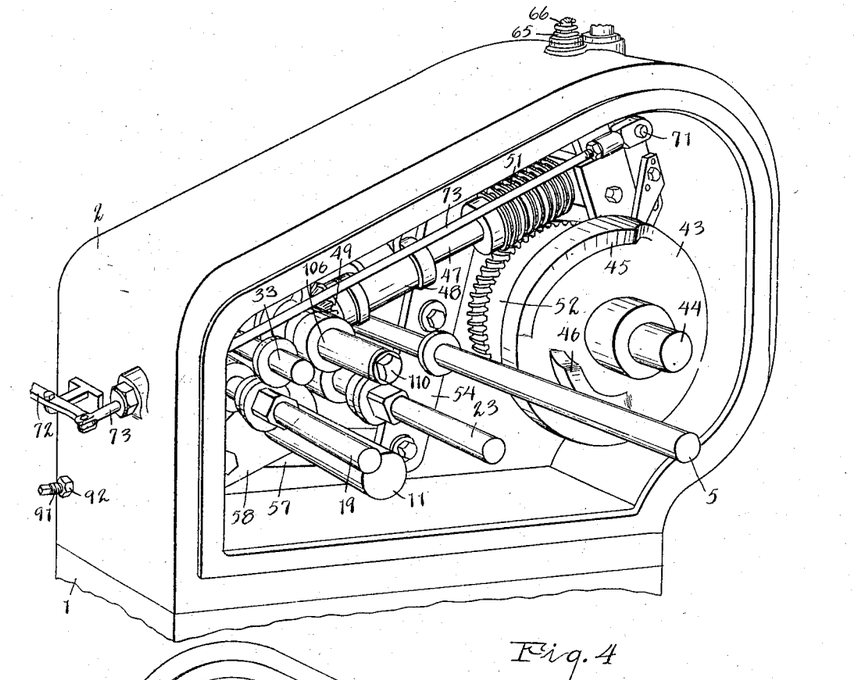
Fig. 4 is a rear perspective view with the side plate of the housing removed.
Figure 5:
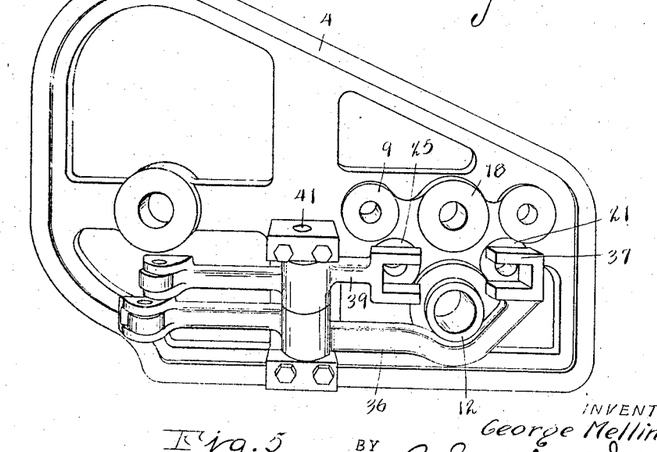
Fig. 5 is a side perspective view of a supporting frame or spider for certain of the moving parts.

This drive consists of a worm shaft 47 carried by the rocking or oscillating frame 48 which is pivoted on the shaft 16. The shaft 16 is provided with a beveled gear 49 meshing with the beveled gear 50 on the shaft 47. The shaft 47 is provided with a worm 51 adapted to be thrown into and out of mesh with a worm gear 52 on the cam shaft 44. The worm is shown in driving engagement in Fig. 2 and out of engagement in Fig. 3.

The work carriage supporting shaft 11 is actuated from the cam 53 on the shaft 44 which coacts with a lever 54 pivoted at 55 and having a cam engaging roller 56. The swinging end of the lever 54 is connected by the link 57 to an arm 58 on the rockshaft.

It will be noted that the cam 53 has two dwells 59 and 60, two abrupt lifts 61 and 62 and two curved non-concentric feeding portions 63 and 64. The purpose of this is to quickly move the work carriage from one position to another, gradually feeding it through the millers, and allowing it to remain stationary when in drilling and reaming positions.

As stated, to control the stopping and starting of the work carriage, the worm 51 is shifted into and out of mesh with the gear 52 on the cam shaft 44. The support 48 is urged yieldingly to inoperative position by means of the spring 65 which is arranged on the outer end of a rod 66 pivoted at 661 to the support and arranged through the housing.

The gear is shifted into engaging position against the tension of this spring 65 by means of the toggle consisting of a link 67 pivoted to the support at 68 and a link 69 pivoted on a hanger 70. The links 67 and 69 are pivotally connected at 71 and are connected to the hand lever 72 by means of the rod or link 73, see Figs. 2, 3 and 4. When the lever 72 is actuated the toggle is straightened, thereby forcing the gear 51 into mesh against the tension of the spring 65 and holding it in mesh during one complete cycle of operation.

The toggle is broken to allow the spring 65 to disengage the gear by means of a tripping dog 74 pivoted at 75 on the cam 43. The dog coacts with an arm 76 on the toggle link 67. The tripping dog has a limited movement between the stops 77 and 78, being normally held against the stop 77 by means of the spring 79.

As the pawl is carried around by the rotation of the cam 43 it comes into engagement with the arm 76. However, the spring 79 is not of sufficient strength to trip the toggle so that the shaft continues to rotate until the pawl is carried against the stop 78, which results in the breaking of the toggle and the lifting of the worm 51. With the breaking of the toggle the arm 76 swings out of the path of the tripping pawl, allowing it to swing against the stop 77 so that when the toggle is straightened to mesh the gears the arm swings down at the rear of the pawl.

To support the worm in proper meshing relation the hanger 70 is provided with an adjustable or threaded thrust member 80 which serves as an adjustable thrust member for the toggle. With this arrangement the oscillation of the work carriage is properly timed or synchronized with the advancing and retracting of the drill and reamer spindles through the mechanism described.

The roller 56 is held against the cam 53 with a uniform tension which, in the structure shown, consists of a weight 81 connected by a suspending chain 82 to a drum 83. This drum is in turn connected by the chain 84 to a drum 85 on the shaft 11. To prevent overthrow as the roller drops or is lifted by the lifts of the cam 53, I provide an adjustable stop member 86 having a slot 87 therein, the ends of the slot forming stops coacting with a pin 88 reciprocating in the slot. This stop member is pivoted at 89 on a swivel head 90 carried by the adjusting screw 91, the screw being threaded into the housing and provided with a lock nut 92.

The work carriage is provided with a holder or chuck consisting of a fixed jaw 93 shaped to receive the work 14 but it will be understood that the details of this jaw will vary as the work varies. Coacting with the jaw 93 is a pivoted chuck jaw 94. The jaw 94 is pivoted at 95 and provided with a cam or eccentric pin 96 resting upon an adjustable support 97. The eccentric 96 is provided with a hand piece 98 which is normally urged to jaw actuating position by means of the spring 99 which is coiled around the eccentric, one end being connected to the movable chuck jaw and the other to the handpiece.

Figures 8, 9, 10, 11:
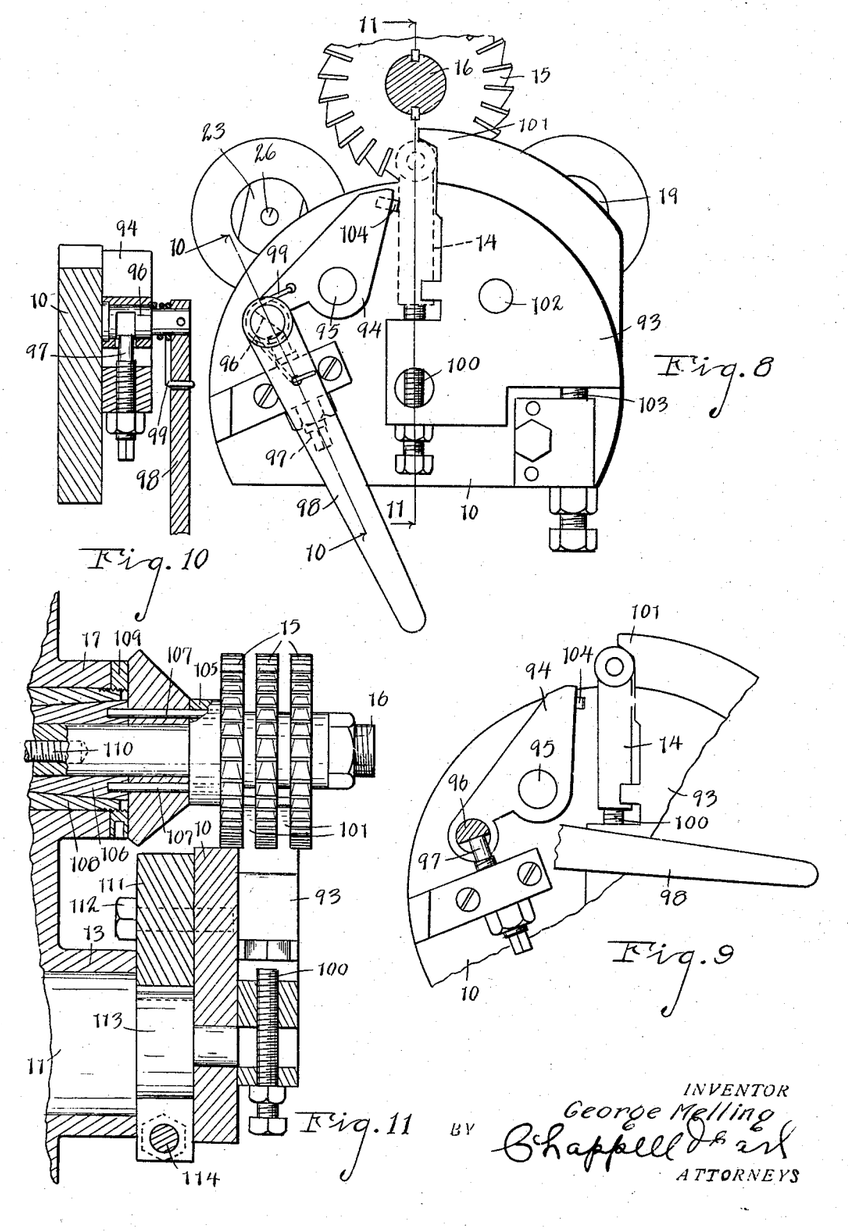
Fig. 8 is a fragmentary front elevation of the oscillating work carriage, a piece of work being indicated by dotted lines.
Fig. 9 is a fragmentary front elevation of parts shown in Fig. 8 with the chuck jaw retracted, the work being shown in full lines.
Fig. 10 is a detail view mainly in section on line 10—10 of Fig. 8 showing details of the work chuck.
Fig. 11 is a detail view partially in section on line 11—11 of Fig. 8 showing details of the work carriage and relation to the milling cutters.

In Fig. 9 the chuck jaw is shown in retracted position. When the work is placed the handle is released and the jaw thrown into work engaging position as described.

An adjustable end support 100 is provided for the work. It will be noted that the fixed jaw 93 projects into the path of the cutters and to properly support the work as it is acted upon by the cutters the jaw has finger-like extensions 101 properly spaced to pass between the cutters, see Figs. 8 to 11.

While I have referred to the jaw 93 as a fixed jaw this is a relative term as it is adjustably supported by the pivot 102 and the adjusting screw 103. The purpose of this is to aline the jaw 93 for the particular work. The jaw 94 is provided with a hardened work engaging member 104.

The cutter head 105 carrying the cutters 15 is mounted for axial adjustment to properly position the cutters, the adjustment in the embodiment illustrated consisting of a tapered sleeve 106 on the shaft or spindle 16, the cutter heads being secured to this sleeve by the axially disposed pins 107. The tapered sleeve 106 is supported in a correspondingly tapered bushing 108 longitudinally adjusted in the box or bearing 17 by means of the threaded ring 109, see Fig. 10. This sleeve and the spindle 16 are clamped together by means of the screw 110 disposed longitudinally of the spindle, see Figs. 4 and 10.

The work carriage 10 is secured to the rockshaft 11 by means of the clamp 111, the clamp being secured on the rear side of the carriage by screws 112 and split to receive the reduced end 113 of the shaft. A clamping bolt 114 is provided to draw the clamp upon the shaft.

Figures 1, 13, 14:
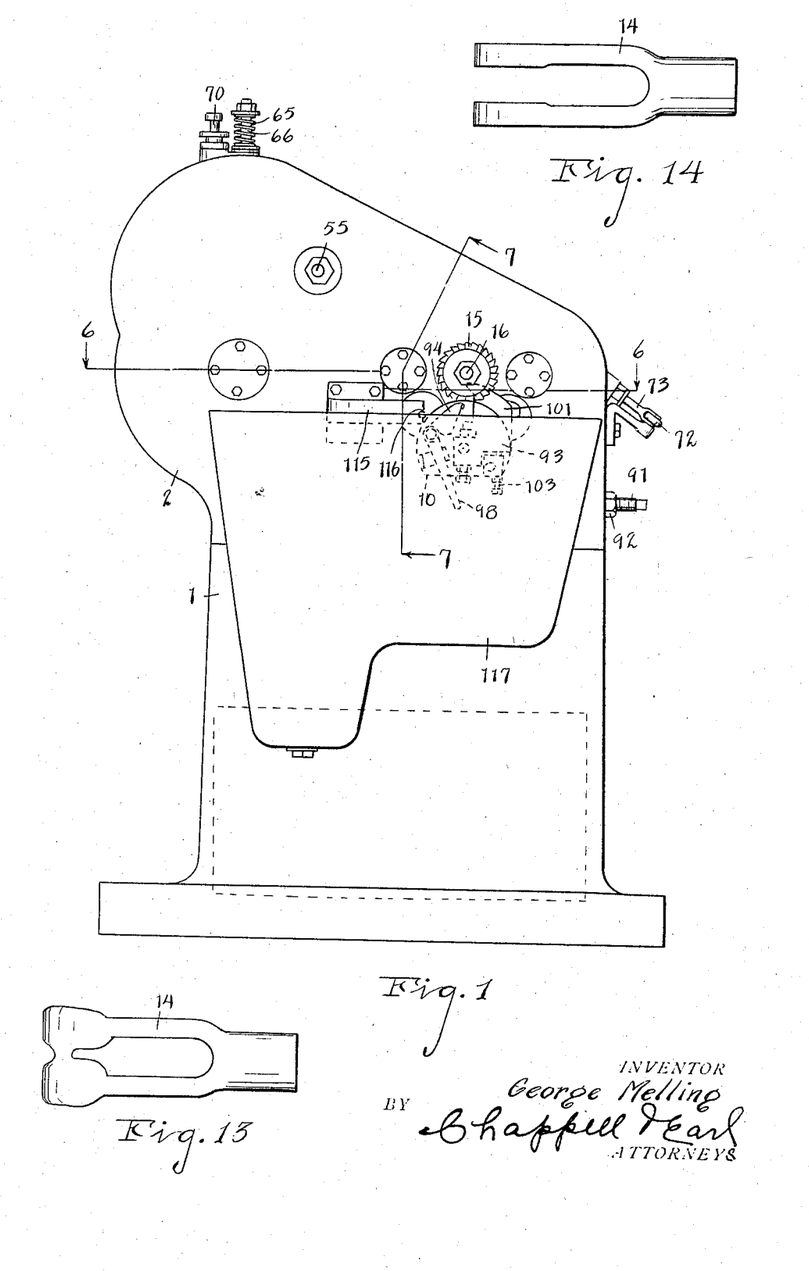
Fig. 1 is a front elevation of my improved milling and drilling machine.
Fig. 13 is a plan view of the work in the rough, usually a drop forging.
Fig. 14 is a plan view of the completed work.

When the work is in drilling position it is supported by the rest 115, see Figs. 1 and 6. The rest is recessed or notched at 116 to receive the drill. The housing is preferably an oil or lubricant type and contains a sufficient quantity of lubricant so that the parts are efficiently and continuously lubricated. A drip pan 117 is arranged below the work holder but the oil pump and its connected parts are not illustrated.

I have illustrated and described my improvements as I have embodied the same in a machine forming couplings or clevices employed on connecting rods and the like. I have not attempted to illustrate or describe various other embodiments or adaptations which I contemplate as I believe the disclosure made will enable those skilled in the art to embody or adapt my improvements as may be desired.

Having thus described my invention what I claim as new and desire to secure by Letters Patent is:

1. In a machine of the class described, the combination of a rockshaft provided with an arm, an oscillating work holder carried by said rockshaft, a cutter unit comprising a shaft disposed parallel with said rockshaft, a drilling unit and a reaming unit, each comprising axially movable spindles disposed on opposite sides of said cutter shaft and parallel therewith, feed levers for said spindles, a cam shaft, cams on said cam shaft coacting with said levers whereby their actuation is timed, means for driving said cam shaft comprising a worm gear thereon, a shaft carrier pivotally mounted on said cutter shaft, a shaft carried by said carrier and provided with a worm coacting with said worm gear, said worm and cutter shafts having coacting beveled gears thereon, a spring acting to return said carrier to worm disengaging position, a toggle comprising a pair of pivotally connected links, one of which is pivotally connected to said carrier and provided with a projecting arm, the other being pivoted to a support, a pivoted lever, a link connecting said lever to said arm on said rockshaft, a cam on said cam shaft coacting with said lever and having portions acting to quickly shift the work holder from one tool unit position to another, dwell portions giving the work holder periods of rest in drilling and reaming positions, and eccentric portions imparting a feeding movement to the work holder in cutter unit position, manually operated means for actuating said toggle, and a trip carried by said cam shaft coacting with said arm on said toggle link.

2. In a machine of the class described, the combination of a rockshaft provided with an arm, an oscillating work holder carried by said rockshaft, a cutter unit comprising a shaft disposed parallel with said rockshaft, a drilling unit and a reaming unit, each comprising axially movable spindles disposed on opposite sides of said cutter shaft and parallel therewith, feed levers for said spindles, a cam shaft, cams on said cam shaft coacting with said levers whereby their actuation is timed, means for driving said cam shaft comprising a worm gear thereon, a shaft carrier pivotally mounted on said cutter shaft, a shaft carried by said carrier and provided with a worm coacting with said worm gear, said worm and cutter shafts having coacting beveled gears thereon, means for controlling said carrier, and a cam on said cam shaft coacting with said lever and having portions acting to quickly shift the work holder from one tool unit position to another, dwell portions giving the work holder periods of rest in drilling and reaming positions, and eccentric portions imparting a feeding movement to the work holder in cutter unit position.

3. The combination of an oscillating work holder, a plurality of tool units operatively associated with said work holder and disposed along the path thereof, means for actuating said work holder comprising a rockshaft provided with an arm, a cam shaft, a driven gear on said cam shaft, a pivotally mounted driving gear carrier, a gear carried by said carrier and coacting with said gear on said cam shaft, a spring acting to normally hold said carrier in gear disengaging position, a toggle comprising pivotally connected links, one of which is pivotally connected to said carrier and provided with a projecting arm, a manually operated means for actuating said toggle, a pivoted lever, a link connecting said lever to said arm on said rockshaft, a cam on said cam shaft having portions acting to quickly shift the work carriage from one tool unit position to another, dwell portions giving the work holder periods of rest when in operative relation to certain of said tool units, and an eccentric portion imparting feeding movement to said work holder relative to another of said tool units, means operatively connected to said rockshaft for urging said lever against said cam, a stop means limiting the throw of said work holder comprising a pivotally and adjustably supported link having a slot therein and a pin on said arm on said rockshaft coacting with said slot.

4. The combination of an oscillating work holder, a plurality of tool units operatively associated with said work holder and disposed along the path thereof, means for actuating said work holder comprising a rock-shaft provided with an arm, a cam shaft, a driven gear on said cam shaft, a pivotally mounted driving gear carrier, a gear carried by said carrier and coacting with said gear on said cam shaft, a spring acting to normally hold said carrier in gear disengaging position, a toggle comprising pivotally connected links, one of which is pivotally connected to said carrier and provided with a projecting arm, a manually operated means for actuating said toggle, a pivoted lever, a link connecting said lever to said arm on said rockshaft, a cam on said cam shaft having portions acting to quickly shift the work carriage from one tool unit position to another, dwell portions giving the work holder periods of rest when in operative relation to certain of said tool units, and an eccentric portion imparting feeding movement to said work holder relative to another of said tool units, and means operatively connected to said rockshaft for urging said lever against said cam.

5. The combination of an oscillating work holder, a plurality of tool units operatively associated with said work holder and disposed along the path thereof, means for actuating said work holder comprising a rockshaft provided with an arm, a cam shaft, a driven gear on said cam shaft, a pivotally mounted driving gear carrier, a gear carried by said carrier and coacting with said gear on said cam shaft, a spring acting to normally hold said carrier in gear disengaging position, means for actuating said gear carrier to gear engaging position, a pivoted lever, a link connecting said lever to said arm on said rockshaft, a cam on said cam shaft having portions acting to quickly shift the work carriage from one tool unit position to another, dwell portions giving the work holder periods of rest when in operative relation to certain of said tool units and an eccentric portion imparting feeding movement to said work holder relative to another of said tool units, means operatively connected to said rockshaft for urging said lever against said cam, a stop means limiting the throw of said work holder comprising a pivotally and adjustably supported link having a slot therein and a pin on said arm on said rockshaft coacting with said slot.

6. The combination of an oscillating work holder, a plurality of tool units operatively associated with said work holder and disposed along the path thereof, means for actuating said work holder comprising a rockshaft provided with an arm, a cam shaft, a driven gear on said cam shaft, a pivotally mounted driving gear carrier, a gear carried by said carrier and coacting with said gear on said cam shaft, a spring acting to normally hold said carrier in gear disengaging position, means for actuating said gear carrier to gear engaging position, a pivoted lever, a link connecting said lever to said arm on said rockshaft, a cam on said cam shaft having portions acting to quickly shift the work carriage from one tool unit position to another, dwell portions giving the work holder periods of rest when in operative relation to certain of said tool units, and an eccentric portion imparting feeding movement to said work holder relative to another of said tool units, and means operatively connected to said rockshaft for urging said lever against said cam.

7. The combination of an oscillating work holder, a plurality of tool units operatively associated with said work holder and disposed along the path thereof, means for actuating said work holder comprising a rockshaft provided with an arm, a cam shaft, a driven gear on said cam shaft, a pivotally mounted driving gear carrier, a gear carried by said carrier and coacting with said gear on said cam shaft, means for actuating said carrier to gear engaging position, means for actuating said toggle, a pivoted lever, a link connecting said lever to said arm on said rockshaft, a cam on said cam shaft having portions acting to quickly shift the work holder from one tool unit position to another, dwell portions giving the work holder periods of rest when in operative relation to certain of said tool units and an eccentric portion imparting feeding movement to said work holder relative to another of said tool units, means operatively connected to said rockshaft for urging said lever against said cam, a stop means limiting the throw of said work holder comprising a pivotally and adjustably supported link having a slot therein and a pin on said arm on said rockshaft coacting with said slot.

8. The combination of an oscillating work holder, a plurality of tool units operatively associated with said work holder and disposed along the path thereof, means for actuating said work holder comprising a rockshaft provided with an arm, a cam shaft, a driven gear on said cam shaft, a pivotally mounted driving gear carrier, a gear carried by said carrier and coacting with said gear on said cam shaft, means for actuating said carrier to gear engaging position, means for actuating said toggle, a pivoted lever, a link connecting said lever to said arm on said rockshaft, and a cam on said cam shaft having portions acting to quickly shift the work holder from one tool unit position to another, dwell portions giving the work holder periods of rest when in operative relation to certain of said tool units and an eccentric portion imparting feeding movement to said work holder relative to another of said tool units.

9. In a machine of the class described, the combination of a rockshaft provided with an arm, an oscillating work holder carried by said rockshaft, a cutter unit comprising a shaft disposed parallel with said rockshaft, a drilling unit and a reaming unit, each comprising axially movable spindles disposed on opposite sides of said cutter shaft and parallel therewith, feed levers for said spindles, a cam shaft, cams on said cam shaft coacting with said levers whereby their actuation is timed, means for driving said cam shaft provided with automatically acting disconnecting means, a pivoted lever, a link connecting said lever to said arm on said rockshaft, and a cam on said cam shaft coacting with said lever and having portions acting to shift the work holder from one tool unit position to another, dwell portions giving the work holder periods of rest in drilling and reaming positions and eccentric portions imparting a feeding movement to the work holder in cutter unit position.

10. In a machine of the class described, the combination of an oscillating work holder, a cutter unit comprising a shaft disposed parallel with said rockshaft, a drilling unit and a reaming unit, each comprising axially movable spindles disposed on opposite sides of said cutter shaft and parallel therewith, feed levers for said spindles, a cam shaft, cams on said cam shaft coacting with said levers whereby their actuation is timed, means for driving said cam shaft provided with automatically acting disconnecting means, and a cam on said cam shaft controlling said work holder and having portions acting to shift the work holder from one tool unit position to another, dwell portions giving the work holder periods of rest in drilling and reaming positions, and eccentric portions imparting a feeding movement to the work holder in cutter unit position.

11. In a machine of the class described, the combination of a rockshaft provided with an arm, an oscillating work holder carried by said rockshaft, a cutter unit comprising a shaft disposed parallel with said rockshaft, a drilling unit and a reaming unit, each comprising axially movable spindles disposed on opposite sides of said cutter shaft and parallel therewith, feed levers for said spindles, a cam shaft, cams on said cam shaft coacting with said levers whereby their actuation is timed, a pivoted lever, a link connecting said lever to said arm on said rockshaft, and a cam on said cam shaft coacting with said lever and having portions acting to shift the work holder from one tool unit position to another, dwell portions giving the work holder periods of rest in drilling and reaming positions, and eccentric portions imparting a feeding movement to the work holder in cutter unit position.

12. In a machine of the class described, the combination of an oscillating work holder, a cutter unit comprising a shaft disposed parallel with said rockshaft, a drilling unit and a reaming unit, each comprising axially movable spindles disposed on opposite sides of said cutter shaft and parallel therewith, feed levers for said spindles, a cam shaft, cams on said shaft coacting with said levers whereby their actuation is timed, and a cam on said cam shaft controlling said work holder and having portions acting to shift the work holder from one tool unit position to another, dwell portions giving the work holder periods of rest in drilling and reaming positions and eccentric portions imparting a feeding movement to the work holder in cutter unit position.

13. In a machine of the class described, the combination of an oscillating work holder, a cutter unit and drilling and reaming units disposed on opposite sides of said cutter unit, said drilling and reaming units being provided with axially movable spindles whereby they may be fed to the work, feed levers for said spindles, a cam shaft, cams on said cam shaft coacting with said levers whereby their actuation is timed, a pivotally mounted gear carrier, a driving gear carried by said carrier, a coacting driven gear on said cam shaft, a work holder actuating cam operatively connected to said work holder to actuate the tool holder giving it periods of rest when in drilling and reaming positions, a toggle for holding said carrier in operative position, one member of said toggle being provided with an arm, means for manually operating said toggle, a pivotally mounted tripping pawl carried by said cam shaft to coact with said arm, stops limiting the swing of said pawl, and a spring acting to normally hold said pawl against said stops, the tension of said spring, however, being insufficient to actuate said tripping arm permitting the pawl to swing against the rear stop to actuate the trip whereby when the toggle is reset the tripping arm will swing behind the pawl.

14. In a machine of the class described, the combination of an oscillating work holder, a cutter unit and drilling and reaming units disposed on opposite sides of said cutter unit, said drilling and reaming units being provided with axially movable spindles whereby they may be fed to the work, feed levers for said spindles, a cam shaft, cams on said cam shaft coacting with said levers whereby their actuation is timed, a pivotally mounted gear carrier, a driving gear carried by said carrier, a coacting driven gear on said cam shaft, a work holder actuating cam operatively connected to said work holder to actuate the tool holder giving it periods of rest when in drilling and reaming positions, means for holding said carrier in operative position, and a tripping pawl carried by said cam shaft to coact with said arm.

15. In a machine of the class described, the combination of an oscillating work holder, a plurality of tool units operatively associated with said work holder and stationed in spaced relation along the path thereof, a cam shaft, means for driving said cam shaft comprising a driving gear thereon, a coacting driven gear, a movably mounted carrier for said driving gear, a spring acting to hold said carrier normally in disengaging position, a toggle for shifting said carrier to worm engaging position comprising a pair of pivotally connected links, one of which is pivotally connected to said carrier and provided with a projecting arm, a cam on said cam shaft operatively associated with said work holder, manually operated means for actuating said toggle, and a tripping pawl pivotally mounted on said cam shaft to rotate therewith, said tripping pawl being provided with means for limiting its pivotal movement and with a spring for holding it normally in its forward position, the tension of such spring being insufficient to release the toggle.

16. In a machine of the class described, the combination of an oscillating work holder, a plurality of tool units operatively associated with said work holder and stationed in spaced relation along the path thereof, a cam shaft, means for driving said cam shaft comprising a driven gear thereon, a coacting driving gear, a movably mounted carrier for said driving gear, a spring acting to hold said carrier normally in disengaging position, a toggle for shifting said carrier to gear engaging position comprising a pair of pivotally connected links, one of which is pivotally connected to said carrier and provided with a projecting arm, a cam on said cam shaft operatively associated with said work holder, manually operated means for actuating said toggle, and a trip mounted on said cam shaft to rotate therewith.

17. In a machine of the class described, the combination of a driving means comprising a driving gear, a coacting driven gear, a movably mounted carrier for said driving gear, a spring acting to hold said carrier normally in disengaging position, a toggle for shifting said carrier to gear engaging position comprising a pair of pivotally connected links, one of which is provided with a projecting arm, the other being pivoted to an adjustably supported hanger, a manually operated means for actuating said toggle, and a pivoted tripping pawl mounted to rotate with said driven gear and provided with means for limiting its pivotal movement and with a spring for holding its normally in its forward position, the tension of such spring being insufficient to release the toggle.

18. In a machine of the class described, the combination of a driving means comprising a driving gear, a coacting driven gear, a movably mounted carrier for said driving gear, a spring acting to hold said carrier normally in disengaging position, a toggle for shifting said carrier to gear engaging position comprising a pair of pivotally connected links, one of which is provided with a projecting arm, a manually operated means for actuating said toggle, and a pivoted tripping pawl mounted to rotate with said driven gear and provided with means for limiting its pivotal movement and with a spring for holding it normally in its forward position, the tension of such spring being insufficient to release the toggle.

19. In a machine of the class described, the combination of driving means comprising a driving gear, a coacting driven gear, a movably mounted driving gear carrier, a spring acting to hold said carrier normally in disengaging position, a toggle for shifting said carrier to gear engaging position, a manually operated means for actuating said toggle, and a pivoted tripping pawl for said toggle mounted to rotate with said driven gear and provided with means for limiting its pivotal movement and with a spring for holding it normally in its forward position, the tension of such spring being insufficient to release the toggle.

20. In a machine of the class described, the combination of a rockshaft provided with an arm, an oscillating work holder carried by said rockshaft, a cutter unit comprising a shaft disposed parallel with said rockshaft, a drilling unit and a reaming unit, each comprising axially movable spindles disposed on opposite sides of said cutter shaft and parallel therewith, timed feed means for said spindles comprising a cam shaft and cams thereon, means for driving said cam shaft, a pivoted lever, a link connecting said lever to said arm on said rockshaft, and a cam on said cam shaft coacting with said lever and having portions acting to shift the work holder from one tool unit position to another, dwell portions giving the work holder periods of rest in drilling and reaming positions and eccentric portions imparting a feeding movement to the work holder in cutter unit position.

21. In a machine of the class described, the combination of an oscillating work holder, a cutter unit comprising a shaft disposed parallel with said rockshaft, a drilling unit and a reaming unit, each comprising axially movable spindles disposed on opposite sides of said cutter shaft and parallel therewith, timed feed means for said spindles, and an actuating cam for said work holder having portions acting to quickly shift the work holder from one tool unit position to another, dwell portions giving the work holder periods of rest in drilling and reaming positions and eccentric portions imparting a feeding movement to the work holder in cutter unit position.

22. The combination of an oscillating work holder, drilling and reaming units disposed in spaced relation, a cutter unit positioned between said drill and reamer units, a work rest positioned to sustain the thrust of the work when in operative relation to said drilling unit, and means for oscillating said work holder from one tool unit position to another, permitting it to remain at rest for predetermined periods in drilling and reaming positions and feeding it at reduced speed through the cutting position.

23. The combination of an oscillating work holder, drilling and reaming units disposed in spaced relation, a cutter unit positioned between said drill and reamer units, and means for oscillating said work holder from one tool position to another, permitting it to remain at rest for predetermined periods in drilling and reaming positions and feeding it at reduced speed through the cutting position.

24. In a machine of the class described, the combination of an oscillating work holder, a plurality of tool units operatively associated with said holder in spaced relation, means for actuating said work holder comprising a driven shaft operatively connected to said work holder, a driven gear on said shaft, a driving gear, a movable carrier for said driving gear, a spring acting to hold said carrier normally in gear disengaging position, a manually actuated means for moving said carrier to gear engaging position, and a trip acting to release said manually actuated means on the return of the work holder to its initial position.

25. The combination of an oscillating work holder, a plurality of tool units operatively associated with said work holder and disposed along the path thereof, means for actuating said work holder comprising a rockshaft provided with an arm, a cam, a pivoted lever, a link connecting said lever to said arm on said rockshaft, means for holding said lever against said cam, and a stop means limiting the throw of said work holder comprising a pivotally and adjustably supported link having a slot therein and a pin on said arm on said rockshaft coacting with said slot.

26. The combination of a movable work holder, a plurality of tool units operatively associated with said work holder and disposed along the path thereof, means for actuating said work holder comprising a cam having portions acting to shift the work holder from one tool unit position to another, a dwell portion permitting the work to rest in operative relation to one of said tool units and a portion imparting a feeding movement to said work holder relative to another of said tool units.

27. In a machine of the class described, the combination of a movable work holder, an axially movable tool spindle operatively associated with said work holder, a feed lever for said spindle, a cam shaft, a cam on said shaft coacting with said lever whereby its actuation is timed, a work holder actuating cam on said sam shaft operatively connected to said work holder, means for driving said cam shaft comprising a driven gear thereon, a movably supported coacting driving gear, a spring acting to hold said driving gear normally in disengaging position, a manually actuated toggle mechanism for shifting said driving gear to engaging position, and a trip carried by said cam shaft for breaking said toggle thereby releasing said driving gear.

28. In a machine of the class described, the combination of a movable work holder, a cam shaft, a work holder actuating cam on said shaft operatively connected to said work holder, means for driving said cam shaft comprising a driven gear thereon, a movably supported coacting driving gear, a spring acting to hold said driving gear normally in disengaging position, a manually actuated toggle mechanism for shifting said driving gear to engaging position, and a trip carried by said cam shaft for breaking said toggle thereby releasing said driving gear.

29. In a machine of the class described, the combination of a movable work holder, an axially movable tool spindle operatively associated with said work holder, a feed lever for said spindle, a cam shaft, a cam on said shaft coacting with said lever whereby its actuation is timed, a work holder actuating cam on said cam shaft operatively connected to said work holder, means for driving said cam shaft comprising a driven gear thereon, a movably supported coacting driving gear, a spring acting to hold said driving gear normally in disengaging position, means for holding said driving gear in driving position, and means controlled by said cam shaft for releasing said driving gear.

30. In a machine of the class described, the combination of a movable work holder, a cam shaft, a work holder actuating cam on said cam shaft operatively connected to said work holder, means for driving said cam shaft comprising a driven gear thereon, a movably supported coacting driving gear, a spring acting to hold said driving gear normally in disengaging position, means for holding said driving gear in driving position, and means controlled by said cam shaft for releasing said driving gear.

In witness whereof I have hereunto set my hand.

GEORGE MELLING.